(12) United States Patent
Ando et al.

(10) Patent No.: US 8,045,268 B2
(45) Date of Patent: Oct. 25, 2011

(54) IMAGING DEVICE, AND DIFFRACTION GRATING LENS FOR USE IN THE DEVICE

(75) Inventors: Takamasa Ando, Osaka (JP); Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 317 days.

(21) Appl. No.: 12/524,040

(22) PCT Filed: Jan. 21, 2008

(86) PCT No.: PCT/JP2008/050693
§ 371 (c)(1),
(2), (4) Date: Jul. 22, 2009

(87) PCT Pub. No.: WO2008/090838
PCT Pub. Date: Jul. 31, 2008

(65) Prior Publication Data
US 2010/0110547 A1  May 6, 2010

(30) Foreign Application Priority Data

Jan. 26, 2007  (JP) .................................. 2007-016007

(51) Int. Cl.
*G02B 5/18* (2006.01)
*G02B 27/44* (2006.01)
(52) U.S. Cl. ........................................ 359/569; 359/565
(58) Field of Classification Search .................. 359/565, 359/566, 569
See application file for complete search history.

(56) References Cited

U.S. PATENT DOCUMENTS

| | | | |
|---|---|---|---|
| 5,940,214 A | 8/1999 | Suzuki et al. | |
| 6,070,980 A | 6/2000 | Obara et al. | |
| 2004/0090678 A1* | 5/2004 | Cho et al. | 359/566 |
| 2007/0258144 A1* | 11/2007 | Kimura et al. | 359/565 |

FOREIGN PATENT DOCUMENTS

JP  04-191716  7/1992
(Continued)

OTHER PUBLICATIONS

International Search Report for corresponding application No. PCT/JP2008/050693 mailed Apr. 15, 2008.
(Continued)

*Primary Examiner* — Stephone Allen
*Assistant Examiner* — Kimberly N Kakalec
(74) *Attorney, Agent, or Firm* — Renner, Otto, Boisselle & Sklar, LLP

(57) ABSTRACT

In a refraction lens having an aspheric shape formed thereon and having a positive power, a diffraction grating is formed on at least one of the faces of the refraction lens. In order to reduce the curvature of field and the chromatic aberration in a well-balanced manner, the zonal pitch of the diffraction grating is constituted so as to satisfy the following conditional expression.

[eq. 19]

$$0.21 m^2 v_d \lambda \frac{f}{h_{max}} < \Lambda_{min} < 0.30 m^2 v_d \lambda \frac{f}{h_{max}} \quad (1)$$

Herein, $\Lambda_{min}$ is a minimum zonal pitch 12; m is an order of diffraction; $v_d$ is an Abbe number of the lens substrate material with respect to the d-line; $\lambda$ is a wavelength; f is an effective focal length; and $h_{max}$ is an effective radius 13 of the face on which the diffraction grating is formed.

5 Claims, 11 Drawing Sheets

FOREIGN PATENT DOCUMENTS

| | | |
|---|---|---|
| JP | 8-508116 | 8/1996 |
| JP | 10-170820 | 6/1998 |
| JP | 10-213739 | 8/1998 |
| JP | 2000-028913 | 1/2000 |
| JP | 2004-118143 | 4/2004 |
| WO | 95/18393 | 7/1995 |

OTHER PUBLICATIONS

Form PCT/IPEA/409 and a partial English translation.

* cited by examiner

IMAGING DEVICE, AND DIFFRACTION GRATING LENS FOR USE IN THE DEVICE

TECHNICAL FIELD

The present invention relates to a diffraction grating lens having a diffraction grating on the lens surface. The present invention relates to an imaging device in which the same is used.

BACKGROUND ART

Conventionally, in answer to needs for compactness and cost reduction of cameras, there is a desire to employ a single lens as a camera lens. However, with a construction based only on a single lens of an aspheric surface, there is little freedom for design parameters, and correction of spherical aberration and coma is possible at best; thus, correction of chromatic aberration and curvature of field is difficult.

Therefore, Patent Document 1 makes an attempt to correct chromatic aberration by adding a diffraction grating on the surface of a single lens.

A diffraction grating has inverse dispersion and anomalous dispersion, and has a large chromatic aberration correction ability. Therefore, using a diffraction grating makes it possible to correct the chromatic aberration which occurs on a single lens.

[Patent Document 1] Japanese National Phase PCT Laid-Open Publication No. 8-508116

DISCLOSURE OF INVENTION

Problems to be Solved by the Invention

However, in a diffraction grating lens, there is a problem in that the curvature of field cannot be sufficiently corrected when more importance is attached to chromatic aberration correction. In the case of a lens which is not required to have oblique incidence characteristics, e.g., an optical pickup application, correction of curvature of field is unnecessary. Also in camera applications, in the case of a silver-halide camera, the curvature of field can be alleviated by curving the film surface. However, in the case of an electronic still camera, a certain level of angle-of-view characteristics is required, and a large curvature of field will cause a deterioration in image quality because the imaging plane is planar.

The present invention aims to provide: a diffraction grating lens in which chromatic aberration and curvature of field are reduced in a well-balanced manner, the diffraction grating lens being usable as a single lens in an electronic still camera or the like; and an imaging device in which the same is used.

Means for Solving the Problems

An imaging device according to the present invention includes: a diffraction grating lens; an angle-of-view restriction member for defining a viewing angle of the diffraction grating lens; and an imaging element for receiving light transmitted through the diffraction grating lens. The diffraction grating lens includes: a lens substrate having a first face and a second face, at least one of the two faces having an aspheric shape, and the lens substrate having a positive power; and a diffraction grating formed on one of the two faces of the lens substrate. Assuming that $\Lambda_{min}$ is a minimum zonal pitch; m is an order of diffraction; $v_d$ is an Abbe number of the lens substrate material with respect to the d-line; $\lambda$ is a wavelength; f is an effective focal length; and $h_{max}$ is an effective radius of the face on which the diffraction grating is formed, the following (eq. 1) is satisfied.

$$0.21 m^2 v_d \lambda \frac{f}{h_{max}} < \Lambda_{min} < 0.30 m^2 v_d \lambda \frac{f}{h_{max}} \qquad (1)$$

Effects of the Invention

According to the present invention, there can be provided an imaging device in which chromatic aberration and curvature of field are reduced in a well-balanced manner, the imaging device being usable even for an electronic still camera or the like.

Figure 1A:
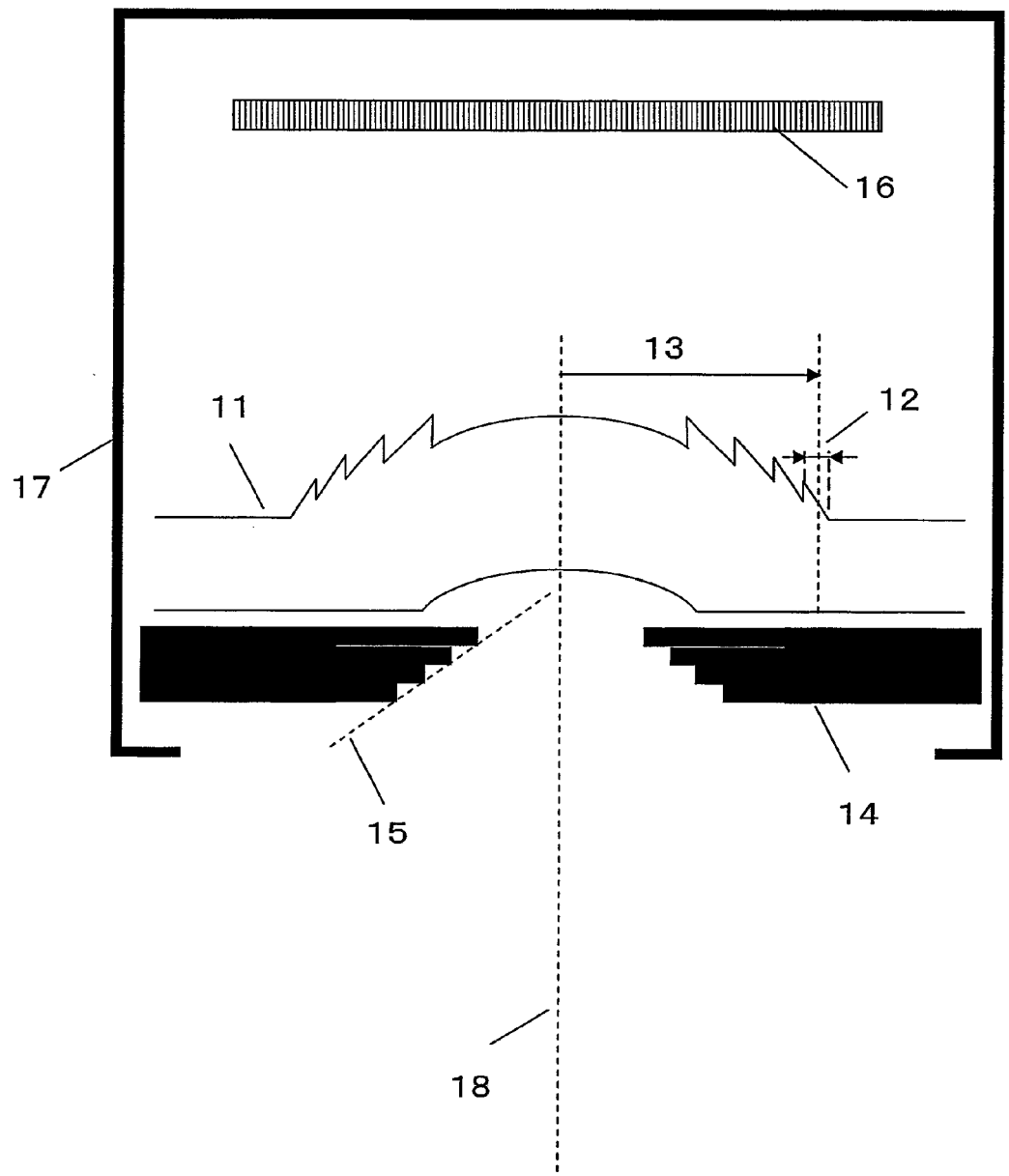
FIG. 1A A diagram showing an embodiment of an imaging device according to the present invention.

DESCRIPTION OF REFERENCE NUMERALS 11, 31, 61, 81, 101, 121, 151
    diffraction grating lens (lens, lens substrate)
12 minimum zonal pitch
13 effective radius
14, 34, 64, 84, 104, 124, 154
    angle-of-view restriction member (diaphragm)
15 gradient
16, 35, 65, 85, 105, 125, 155 imaging element
17 optical hood
18 optical axis
32, 62, 82, 102, 122, 152 first face
33, 63, 83, 103, 123, 153 second face
41, 71, 91, 111, 131, 161
    amount of axial chromatic aberration
42, 72, 92, 112, 132, 162
    amount of curvature of field aberration
156 protection film

BEST MODE FOR CARRYING OUT THE INVENTION

Hereinafter, with reference to FIGS. 1A to 1B, an embodiment of an imaging device according to the present invention will be described.

Figure 1B:
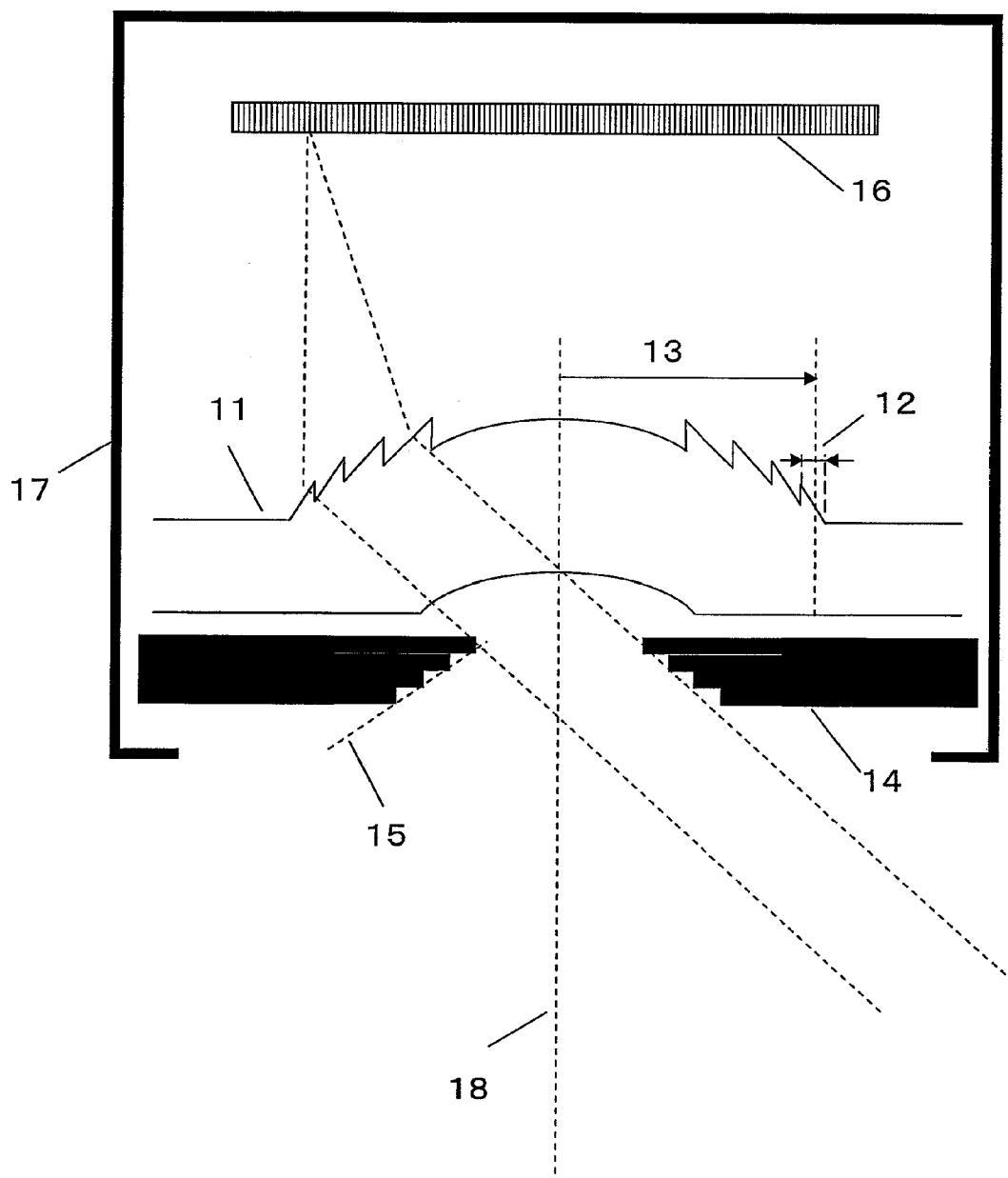
FIG. 1B A diagram showing the function of an angle-of-view restriction member 14 in the imaging device shown in FIG. 1A.

First, FIG. 1A is referred to. An imaging device of the present embodiment includes a diffraction grating lens 11, an angle-of-view restriction member 14, and an imaging element 16. Moreover, in the imaging device of FIG. 1A, an optical hood 17 covers the diffraction grating lens 11 and the imaging element 16 so that unnecessary light will not enter between the diffraction grating lens 11 and the imaging element 16 from the exterior.

The diffraction power of the diffraction grating lens 11 increases as a zonal pitch of the diffraction grating is decreased. Therefore, by reducing the zonal pitch to increase the power of the entire lens by diffraction, the power ascribable to diffraction can be made relatively small. On the other hand, since the Petzval sum of the diffraction grating is almost 0, by making the power ascribable to diffraction relatively small, the Petzval sum of the entire diffraction grating lens 11 can be made small. As a result, by adding a diffraction grating to a lens substrate, it becomes possible to reduce the curvature of field. In other words, by using a diffraction grating, not only a correction of chromatic aberration but also a correction of curvature of field is enabled.

As shown in FIG. 1A, the diffraction grating lens 11 of the present embodiment is a lens having a positive power, such that both of its light-entering surface (first face) and light-outgoing surface (second face) are aspheric surfaces. Moreover, the diffraction grating lens 11 includes a diffraction grating which is formed on only one of the first face and the second face. Note that an envelope connecting the lower ends of the diffraction grating is an aspheric surface. The reason why the face on which a diffraction grating is formed is limited to one of the faces of the lens is in order to reduce the amount of flare occurring due to a diffraction surface. The face on which a diffraction grating is formed may be either the first face or the second face so long as it is one face of the lens.

Herein, as shown in FIG. 1A, a minimum zonal pitch 12 refers to the smallest pitch width among the pitch widths of zones that are within a region spanning an effective radius 13 of a face of the lens substrate on which a diffraction grating is present; usually, that of the outermost zone is the smallest.

The angle-of-view restriction member 14 includes an aperture having a size that defines the diameter of an incident beam, and may be referred to as a "diaphragm". An angle of view of the diffraction grating lens 11 is defined by the angle-of-view restriction member 14. As shown in FIG. 1A, a gradient 15 which is matched to the angle of view is formed on a side face of the aperture being provided in the center of the angle-of-view restriction member 14. By conferring such a gradient 15, it becomes possible to prevent a decrease in the light amount of rays which are obliquely incident.

Since at least some of the rays entering the aperture of the angle-of-view restriction member 14 at a tilt angle which is greater than the angle of the gradient 15 are blocked by the angle-of-view restriction member 14, either their beam cross-sectional area is narrowed, or they do not reach the imaging element 16 at all.

The effective radius 13 is defined by the radius and shape of the aperture of the angle-of-view restriction member 14. FIG. 1B shows a manner in which obliquely-incident rays pass through the aperture of the angle-of-view restriction member 14, and are diffracted by the diffraction grating lens 11. In the state shown in FIG. 1B, obliquely-incident rays are forming an image on a circle which is determined by the effective radius 13.

Now, assuming that $\Lambda_{min}$ is the minimum zonal pitch; m is the order of diffraction; $v_d$ is an Abbe number of the lens substrate material with respect to the d-line; $\lambda$ is a wavelength; f is an effective focal length and; $h_{max}$ is an effective radius of the face on which the diffraction grating is formed, the imaging device of the present embodiment satisfies the following expression (1).

[eq. 2]

$$0.21 m^2 v_d \lambda \frac{f}{h_{max}} < \Lambda_{min} < 0.30 m^2 v_d \lambda \frac{f}{h_{max}} \quad (1)$$

More preferably, the following expression (2) is satisfied.

[eq. 3]

$$0.21 m^2 v_d \lambda \frac{f}{h_{max}} < \Lambda_{min} < 0.28 m^2 v_d \lambda \frac{f}{h_{max}} \quad (2)$$

The reasons why it is preferable to satisfy the above equations will be described later.

Figure 1C:
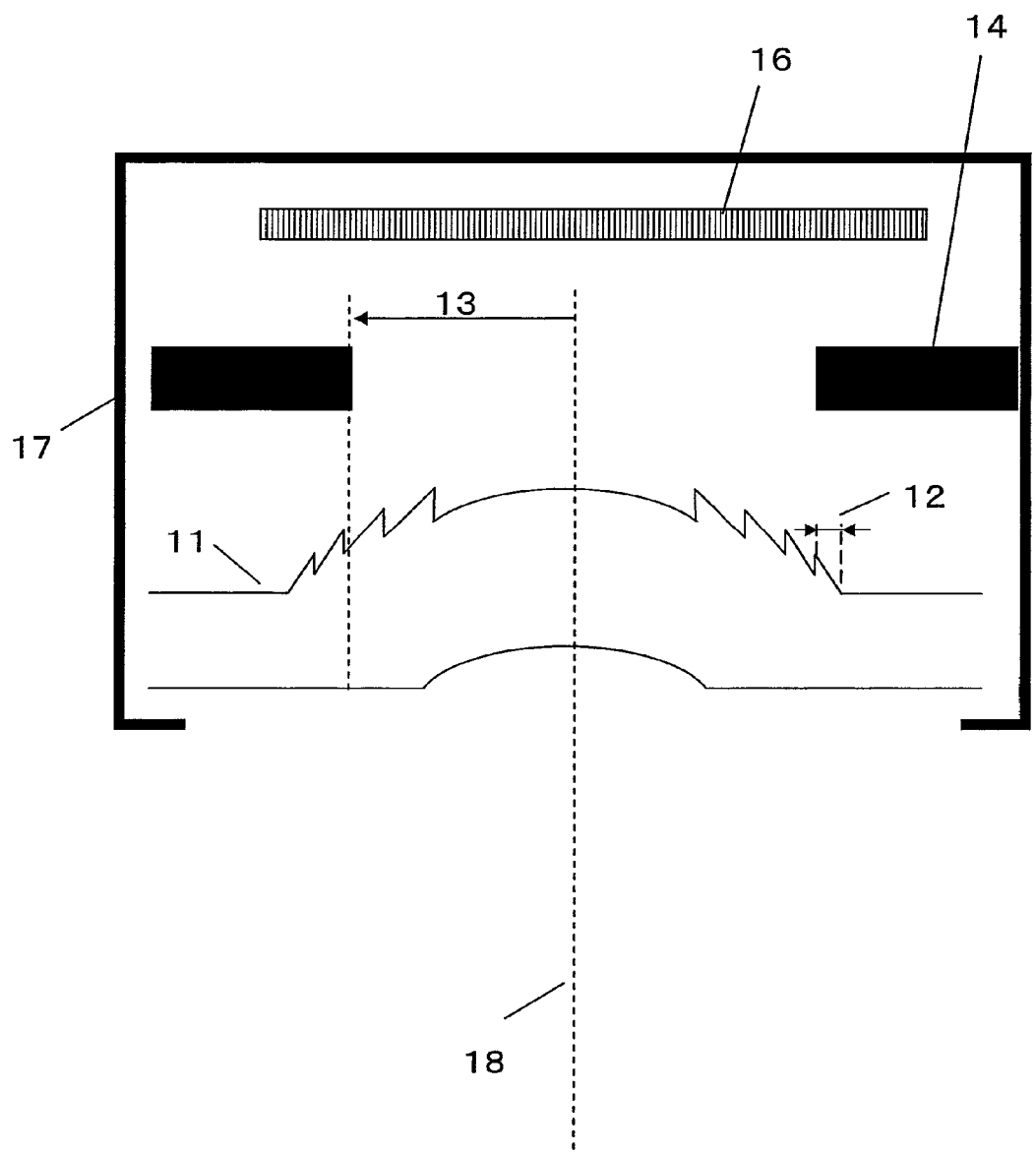
FIG. 1C A diagram showing another embodiment of the imaging device according to the present invention.

Note that the angle-of-view restriction member 14 does not need to be positioned frontward of the diffraction grating lens 11, but may be disposed between the diffraction grating lens 11 and the imaging element 16 as shown in FIG. 1C.

Figure 2:
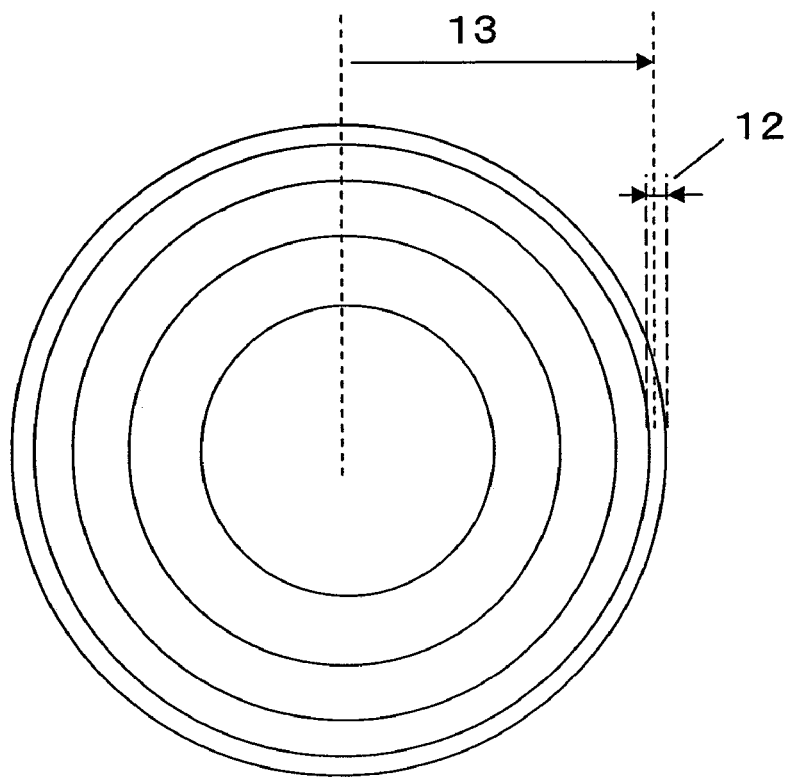
FIG. 2 A plan view of a diffraction surface of a diffraction grating lens according to the present invention as viewed in an optical axis direction.

FIG. 2 is a plan view of the diffraction grating lens 11, where the face carrying the zones is viewed in the optical axis direction. In the case of a lens for imaging applications, in order to obtain good aberration characteristics, it is desirable that the zone shapes are rotation symmetrical with reference to the optical axis.

The minimum zonal pitch $\Lambda_{min}$ can be derived as follows. Note that a phase function method and a high refractive index method are mainly used as the designing methodology for diffraction grating lenses. Although the phase function method will be taken as an example below, it is not intended that this method is the only method; the end result will be the same also in the case where the high refractive index method is used for designing.

The phase function method assumes that a diffraction grating is on the lens surface, and performs a phase conversion of the wavefront as expressed by the following equations on that surface.

[eq. 4]

$$\phi(h) = \frac{2\pi}{\lambda}\psi(h)$$
$$\psi(h) = a_2 h^2 + a_4 h^4 + a_6 h^6 + a_8 h^8 + a_{10} h^{10}$$
$$(h^2 = x^2 + y^2)$$

In the equations of (eq. 4), $\phi$ is a phase function; $\Psi$ is an optical path difference function; h is a distance from the optical axis along a radial direction; and $a_2$, $a_4$, $a_6$, $a_8$, and $a_{10}$ are coefficients. It suffices if the coefficients are provided up to $a_{10}$; however, they may go up to a greater order, or a smaller order, and are arbitrary.

In the optical path difference function $\Psi$, the first term is a term which substantially determines the power of diffraction, and the second and later terms are terms for correcting the spherical aberration and coma which the first term alone fails to correct. Generally speaking, contributions of the second and later terms to the diffraction power are sufficiently smaller than that of the first term. Since the intensity of the diffraction power corresponds to the amount of optical path difference, the first term is predominant in the entire equation, and the optical path difference $\Psi_j$ at an arbitrary radius $h_j$ can be approximated as shown by the equation of (eq. 5).

$$\Psi_j(h) \approx a_2 h_j^2 \quad [\text{eq. 5}]$$

Thus, by taking it into consideration that the difference between $\Psi_j$ and $\Psi_{j-1}$ is $m\lambda$, the pitch $\Lambda_j$ ($=h_j - h_{j-1}$) of a $j^{th}$ zone as counted from the center is as follows, in a range where the optical path difference is sufficiently greater than the wavelength, i.e., in a region where $\Psi_j \gg m\lambda$.

[eq. 6]

$$\Lambda_j = \frac{-m\lambda}{2a_2 h_j}$$

Herein, a2 is negative when m>0, and positive when m<0.

Generally speaking, a focal length $f_D$ of a diffractive lens plate of an $m^{th}$-order diffraction can be determined from (eq. 7).

[eq. 7]

$$f_D = -\frac{1}{2a_2 m}$$

Therefore, given that a proportion of the diffraction power relative to the total power of a diffractive lens is C, (eq. 8) is derived.

[eq. 8]

$$a_2 = -\frac{C}{2mf}$$

Herein, f is an effective focal length as described earlier. By substituting (eq. 8) into (eq. 6), the minimum zonal pitch $\Lambda_{min}$ can be determined as follows.

[eq. 9]

$$\Lambda_{min} = \frac{m^2}{C}\frac{f\lambda}{h_{max}}$$

Thus, by controlling the minimum zonal pitch $\Lambda_{min}$, it becomes possible to adjust the proportion C of the diffraction power, thus making it possible to adjust the amounts of correction for chromatic aberration and curvature of field.

Moreover, since a stronger color correction needs to be applied as the wavelength dispersion of the lens substrate material increases, the required proportion C of diffraction power is in inverse proportion to the Abbe number $v_d$ of the lens substrate material. Therefore, given that $C = 1/kv_d$, (eq. 9) can be restated into (eq. 10).

[eq. 10]

$$\Lambda_{min} = km^2 v_d f \frac{\lambda}{h_{max}}$$

By adjusting this value of k, it is possible to determine the amounts of correction for chromatic aberration and curvature of field. In order to reduce the curvature of field and the chromatic aberration in a well-balanced manner, it may be ensured that the number of zones of the diffraction grating satisfy the following conditional expression.

[eq. 11]

$$0.21 m^2 v_d \lambda \frac{f}{h_{max}} < \Lambda_{min} < 0.30 m^2 v_d \lambda \frac{f}{h_{max}} \quad (1)$$

As a more effective condition, it is more desirable to satisfy the following inequality.

[eq. 12]

$$0.21 m^2 v_d \lambda \frac{f}{h_{max}} < \Lambda_{min} < 0.28 m^2 v_d \lambda \frac{f}{h_{max}} \quad (2)$$

Moreover, since the curvature of field is reduced, the diffraction grating lens 11 is superior in oblique incidence characteristics, and it is particularly effective to set the maximum half angle of view to 15° or more. However, it is not that the curvature of field is completely corrected; therefore, the amount of curvature will increase as the angle of view increases, and if the maximum half angle of view exceeds 40°, the image quality will be deteriorated, which is not preferable. Therefore, it is preferable to set the maximum half angle of view in a range of no less than 15° and no more than 40°, and more preferably in a range of no less than 20° and no more than 35°.

As shown in FIG. 1A, the gradient portion which is provided in the aperture of the angle-of-view restriction member 14 is preferably in the form of steps because it will alleviate unnecessary light which is reflected at the side face of the angle-of-view restriction member 14 and enters the lens. As shown in FIG. 1A, in the case where the angle-of-view restriction member 14 is present on the object side, it is desirable that the gradient 15 of a line connecting the tips of the step-shapes is no less than 15° and no more than 40° with respect to the optical axis 18. On the other hand, in the case where the angle-of-view restriction member 14 is present between the imaging element 16 and the diffraction grating lens 11, it may be matched to the outgoing marginal inclination of a ray of the maximum angle of view that passes through the diffraction grating lens 11.

The imaging element 16 performs a photoelectric conversion for converting an image which is formed through the diffraction grating lens 11 into an electrical signal. An imaging region of the imaging element 16 needs to have a size which sufficiently enables imaging for rays entering at the maximum angle of view.

The imaging device of the present embodiment is suitably used for color imaging, and therefore it is desirable that an imaging element 16 with color capabilities is used. An example of such an imaging element 16 is an imaging element in which 3 primary color filters of RGB are disposed in an order which is referred to as the Bayer pattern. Even in a monochromatic application, the imaging device of the present invention will be effective when used in a wavelength range with some width. In the case of a monochromatic application, a monochromatic imaging element may be used.

The image information which is obtained with the imaging element 16 is sent to a processing section not shown, and is subjected to various kinds of image processing, e.g., white balance, and gain adjustment.

EXAMPLES

Hereinafter, Examples of the present invention will be specifically described. The present invention is not to be limited to the following Examples.

The shape of any lens of the present Examples is expressed by an aspheric formula of (eq. 13).

[eq. 13]
$$z = \frac{ch^2}{1 + \sqrt{1 - (K+1)c^2 h^2}} + Ah^4 + Bh^6 + Ch^8 + Dh^{10} + Eh^{12}$$
$$(h^2 = x^2 + y^2)$$

(Eq. 13) is an equation representing an aspheric surface when rotated around a z axis which is perpendicular to an x-y plane, where c is a center of curvature, and A, B, C, D, and E are coefficients representing offsets from the quadric surface. It suffices if the coefficients are provided up to E; however, they may go up to a greater order, or a smaller order, and are arbitrary. Depending on the K value, the following aspheric surfaces will be obtained:

when 0>K, an ellipsoid whose short radius is the optical axis;
when K=0, a spherical surface;
when −1<K<0, an ellipsoid whose long radius is the optical axis;
when K=−1, a paraboloid; and
when K<−1, a hyperboloid.

Moreover, the diffraction surface of the lens is designed by using the phase function method. The phase function method assumes that a diffraction grating is on the lens surface, and performs a phase conversion of the wavefront as expressed by the following equations on that surface.

[eq. 14]
$$\phi(h) = \frac{2\pi}{\lambda} \psi(h)$$
$$\psi(h) = a_2 h^2 + a_4 h^4 + a_6 h^6 + a_8 h^8 + a_{10} h^{10}$$
$$(h^2 = x^2 + y^2)$$

Herein, $\phi$ is a phase function; $\Psi$ is an optical path difference function; h is a distance along a radial direction; and $a_2$, $a_4$, $a_6$, $a_8$, and $a_{10}$ are coefficients. It suffices if the coefficients are provided up to $a_{10}$; however, they may go up to a greater order, or a smaller order, and are arbitrary. The order of diffraction is the 1$^{st}$ order.

In the actual fabrication, based on the phase function, a refractive index difference and a design wavelength of the material are translated into amounts of displacement along the optical axis direction of the diffraction grating, and thus a diffraction grating is formed on the substrate surface.

Example 1

Figure 3:
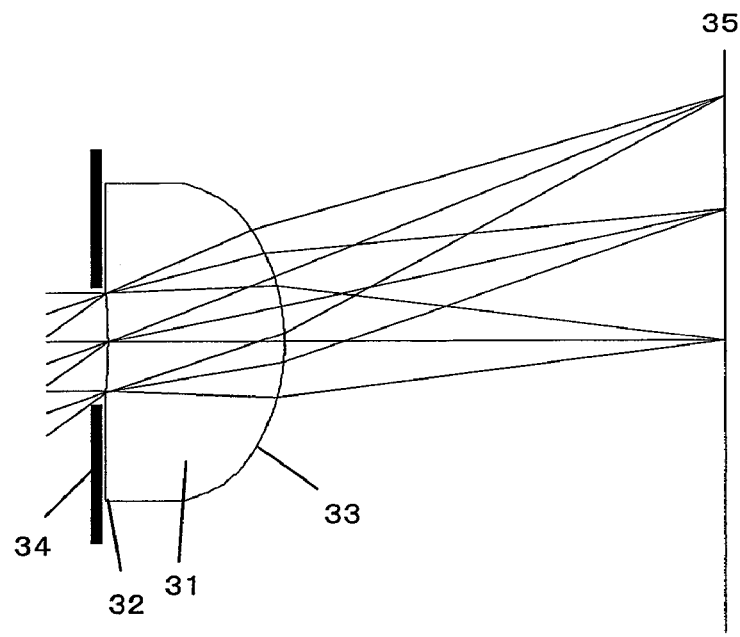
FIG. 3 A cross-sectional view of a diffraction grating lens of Example 1.

FIG. 3 is a diagram showing a lens 31 of Example 1. A diaphragm 34 is added on a first face 32 of the lens 31, and a second face 33 has a diffraction grating formed on its aspheric envelope. An imaging element 35 has a planar shape, and is disposed at the image point.

The substrate material of the lens 31 is a resin whose main component is polycarbonate. As used herein, a "resin whose main component is polycarbonate" means a resin which contains 95 weight % or more, and preferably 98 weight % or more, of polycarbonate. Although polycarbonate is used as the resin, there is no limitation so long as the resin has a predetermined refractive index. For example, polyethylene, polystyrene, or the like may be used.

Numerical data of the diffraction grating lens of Example 1 is shown below. In the following data, $\omega$ is a half angle of view; $F_{no}$ is an aperture ratio; $n_d$ is a refractive index of the lens substrate with respect to the d-line; $v_d$ is an Abbe number of the lens substrate with respect to the d-line; and t is a distance between lens faces (distance between plane centers along the optical axis).

$\omega$=35.3°
$F_{no}$=4.
$n_d$=1.585
$v_d$=27.9
t=0.8 mm
(aspheric coefficient of the first face)
c=−0.4030
K=−1565.5922
A=−6.3106
B=169.6545
C=−2643.2978
D=16157
(aspheric coefficient of the second face)
c=−1.0540
K=−0.9047
A=0.1261
B=−2.3832
C=8.6418
D=−13.2194

(phase factor of the second face)
m=1
design wavelength λ=540 nm
$a_2$=−0.0326
$a_4$=−0.1581
$a_6$=1.2616
$a_8$=−4.6734
$a_{10}$=6.4794
focal length f=1.819 mm
$h_{max}$=0.510 mm
minimum zonal pitch $\Lambda_{min}$=13.2 μm With this construction, the value of the constant k in (eq. 10) is 0.246, thus indicating that Example 1 satisfies conditional expressions (1) and (2).

Figure 4:
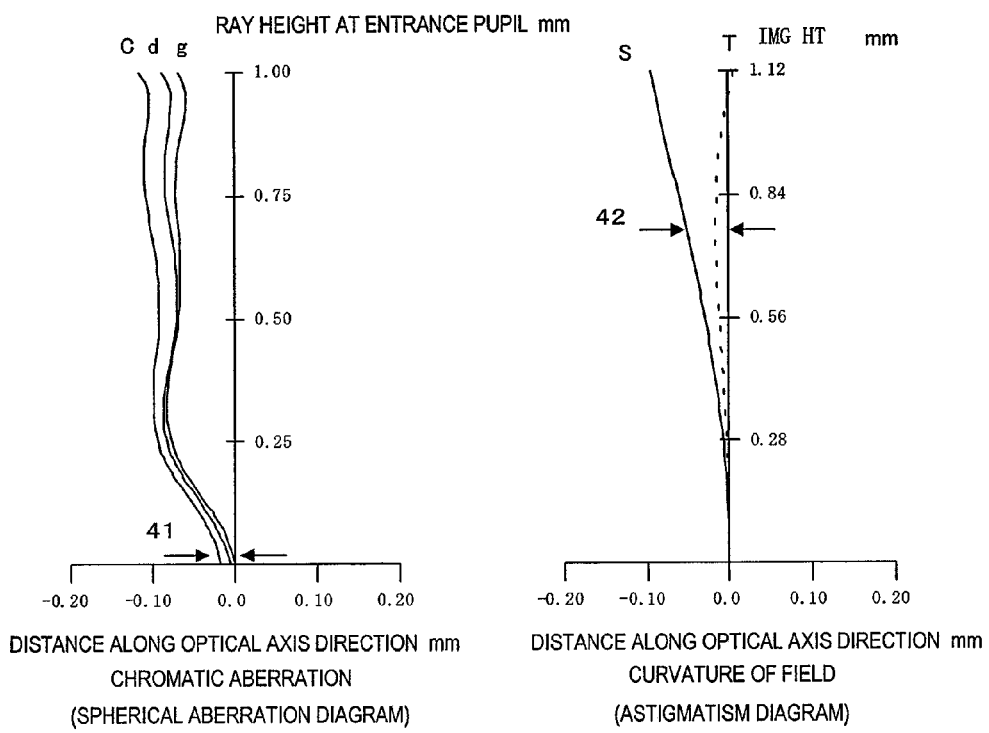
FIG. 4 Diagrams showing chromatic aberration and curvature of field of the diffraction grating lens of Example 1.

FIG. 4 is diagrams showing the chromatic aberration and the amount of curvature of field of Example 1, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 41. In the astigmatism diagram, the horizontal axis represents a distance along the optical axis direction and the vertical axis represents an image height. Therefore, the distance from the vertical axis is the amount of curvature of field aberration 42 at each image height, and, in general, the curvature of field constitutes a spherical surface whose axis is the optical axis. Herein, T means tangential, and S means sagittal.

In FIG. 4, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the correction of chromatic aberration is slightly excessive. Conversely, however, the diffraction power due to the aspheric surface is reduced by this effect, thus making the curvature of field small. Therefore, as is clear from the aberration diagram, the amount of axial chromatic aberration 41 and the amount of curvature of field aberration 42 are adequately corrected in a well-balanced manner.

Figure 5:
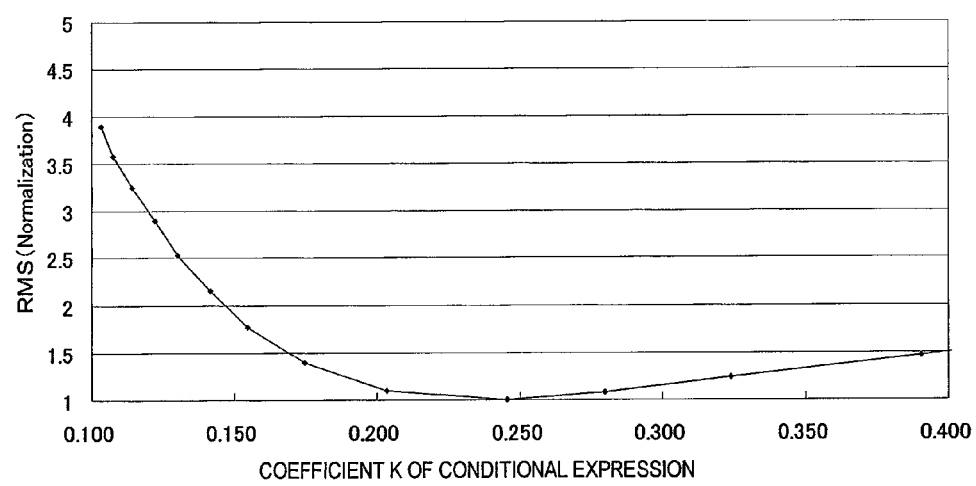
FIG. 5 A graph showing a relationship between an RMS value of the amount of curvature of field aberration and the amount of axial chromatic aberration of the diffraction grating lens of Example 1 and the k value.

FIG. 5 shows, with respect to Example 1, changes in an RMS value (root mean square value) of the amount of curvature of field aberration 42 and the amount of axial chromatic aberration 41, where the proportion of the power of diffraction is varied while the power of the entire lens is kept constant. Now, the curvature of field is spherical in shape, and the amount of curvature of field aberration 42 drastically increases as the image height increases. Therefore, about 70% of the maximum image height may be selected as a representative point of the amount of curvature of field aberration 42. Specifically, the amount of curvature of field aberration 41 is defined as the difference in distance along the optical axis direction between an image point on the optical axis on the Petzval surface and that of an image height which is 70% of the maximum image height. The amount of axial chromatic aberration 41 is defined as the difference between imaged points for rays of wavelengths 640 nm and 440 nm which pass through the entrance pupil near the zero height. The k on the horizontal axis is the value of the constant k in (eq. 10). The vertical axis is normalized based on the minimum value of RMS. FIG. 5 shows that the amount of curvature of field aberration and the amount of axial chromatic aberration are corrected with a better balance as the RMS value decreases.

It can be seen from FIG. 5 that, by ensuring that the value of the constant k is no less than 0.21 and no more than 0.30, the RMS value can be kept to 1.2 or less (within 120% of the value defining the minimum value), so that the chromatic aberration and the curvature of field are reduced in a well-balanced manner. If the constant k exceeds 0.30, the RMS value becomes too large, thus resulting in a deteriorated performance as an imaging lens. This is because the curvature of field is too large. Also if the constant k is less than 0.21, the RMS value is too large, thus resulting in a deteriorated performance as an imaging lens. This is because the chromatic aberration is too large.

Note that, by ensuring that the value of the constant k is no less than 0.21 and no more than 0.28, the RMS value can be made about 1.15 (within 115% of the value defining the minimum value), whereby the chromatic aberration and curvature of field can be reduced with an even better balance.

Example 2

Figure 6:
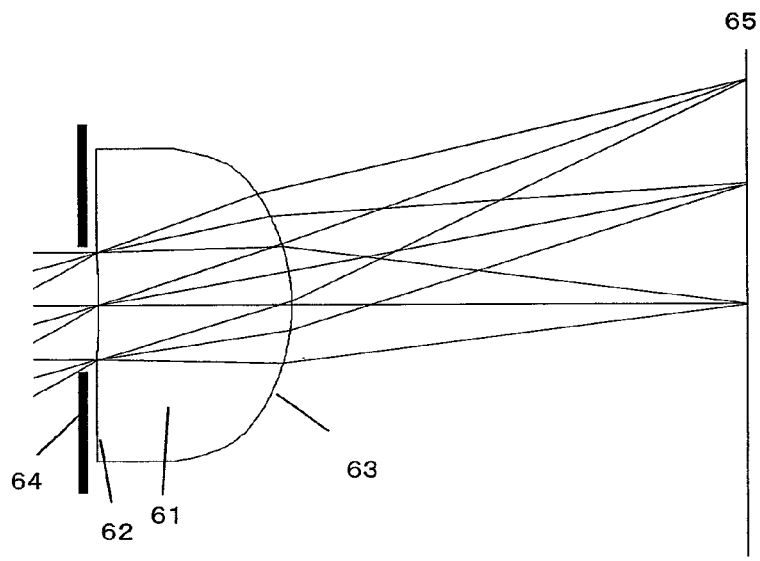
FIG. 6 A cross-sectional view of a diffraction grating lens of Example 2.

FIG. 6 is a diagram showing a lens 61 of Example 2. A diaphragm 64 is added on a first face 62 of the lens 61, and a first face 63 has a diffraction grating formed on its aspheric envelope. An imaging element 65 has a planar shape, and is disposed at the image point.

The substrate material of the lens 61 is cycloolefin-type resin ("ZEONEX" manufactured by Nippon Zeon Co., Ltd.). As used herein, a "resin whose main component is a cycloolefin-type resin" means a resin which contains 90 weight % or more, and more preferably 95 weight % or more, of a cycloolefin-type resin. Although a cycloolefin-type resin is used as the resin, there is no limitation so long as the resin has a predetermined refractive index. For example, polyethylene, polystyrene, or the like may be used.

Numerical data of the diffraction grating lens of Example 2 is shown below.
ω=29.3°
$F_{no}$=4.0
$n_d$=1.524
$v_d$=56.2
t=0.96 mm
(aspheric coefficient of the first face)
c=−0.2606
K=43.4567
A=−0.0953
B=−12.5995
C=231.3465
D=−1194.4115
E=−2.1554e−9
(phase factor of first face)
m=1
design wavelength λ=540 nm
$a_2$=−0.0120
$a_4$=−0.5067
$a_6$=10.4742
$a_8$=−106.2261
$a_{10}$=465.0468
(aspheric coefficient of the second face)
c=−0.9845
K=0.2908
A=−0.1190
B=1.9123
C=−10.3719
D=27.1525
E=−27.0980 focal length f=2.172 mm
$h_{max}$=0.270 mm
minimum zonal pitch $\Lambda_{min}$=59.4 μm With this construction, the value of the constant k in (eq. 10) is 0.243, thus indicating that Example 2 satisfies conditional expressions (1) and (2).

Figure 7:
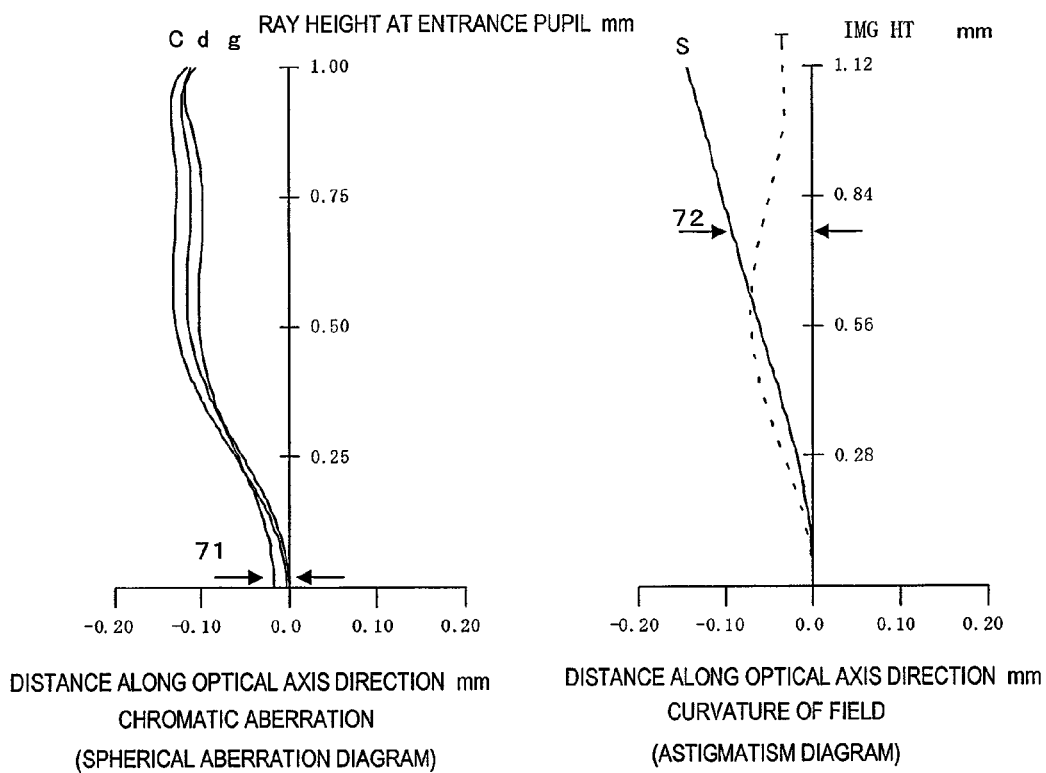
FIG. 7 Diagrams showing chromatic aberration and curvature of field of the diffraction grating lens of Example 2.

FIG. 7 is diagrams showing the chromatic aberration and the amount of curvature of field of Example 2, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 71. In the astigmatism diagram, the horizontal axis represents a distance along the optical axis direction and the vertical axis represents an image height. Therefore, the distance from the vertical axis is the amount of curvature of field aberration 72 at each image height, and, in general, the curvature of field constitutes a spherical surface whose axis is the optical axis. Herein, T means tangential, and S means sagittal.

In FIG. 7, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the chromatic aberration correction is slightly excessive. Conversely, however, the diffraction power due to the aspheric surface is reduced by this effect, thus making the curvature of field small. Therefore, as is clear from the aberration diagram, the amount of axial chromatic aberration 71 and the amount of curvature of field 72 are adequately corrected in a well-balanced manner.

In Example 2, too, results similar to those of Example 1 are obtained regarding the diagram which shows changes in an RMS value of the amount of curvature of field aberration and the amount of axial chromatic aberration when the proportion of the power of diffraction is varied, i.e., when the value of the constant k is varied.

Example 3

Figure 8:
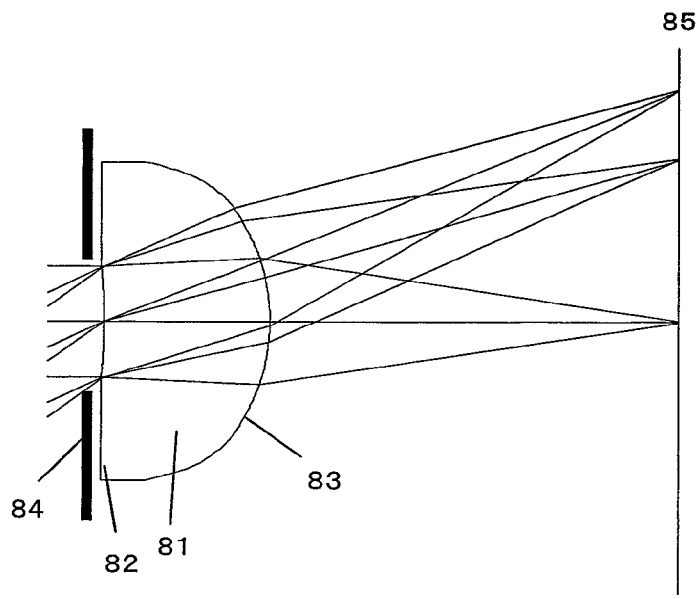
FIG. 8 A cross-sectional view of a diffraction grating lens of Example 3.

FIG. 8 is a diagram showing a lens 81 of Example 3. A diaphragm 84 is added on a first face 82 of the lens 81, and a second face 83 has a diffraction grating formed on its aspheric envelope. An imaging element 85 has a planar shape, and is disposed at the image point.

The substrate material of the lens 81 is a resin whose main component is polycarbonate. As used herein, a "resin whose main component is polycarbonate" means a resin which contains 95 weight % or more, and preferably 98 weight % or more, of polycarbonate. Although polycarbonate is used as the resin, there is no limitation so long as the resin has a predetermined refractive index. For example, polyethylene, polystyrene, or the like may be used.

Numerical data of the diffraction grating lens of Example 3 is shown below.
ω=35.2°
$F_{no}$=3.4
$n_d$=1.585
$v_d$=27.9
t=0.8 mm
(aspheric coefficient of the first face)
c=−0.3891
K=−1090.1768
A=−4.3097
B=77.6987
C=−844.8659
D=3583.2210
(aspheric coefficient of the second face)
c=−1.0380
K=−0.9056
A=0.1039
B=−2.1356
C=7.1890
D=−10.0174
(phase factor of the second face)
m=1
design wavelength λ=540 nm
$a_2$=−0.0344
$a_4$=−0.1352
$a_6$=1.0786
$a_8$=−3.8629
$a_{10}$=5.0122
focal length f=1.833 mm
$h_{max}$=0.551 mm
minimum zonal pitch $\Lambda_{min}$=12.4 μm With this construction, the value of the constant k in (eq. 10) is 0.247, thus indicating that Example 3 satisfies conditional expressions (1) and (2).

Figure 9:
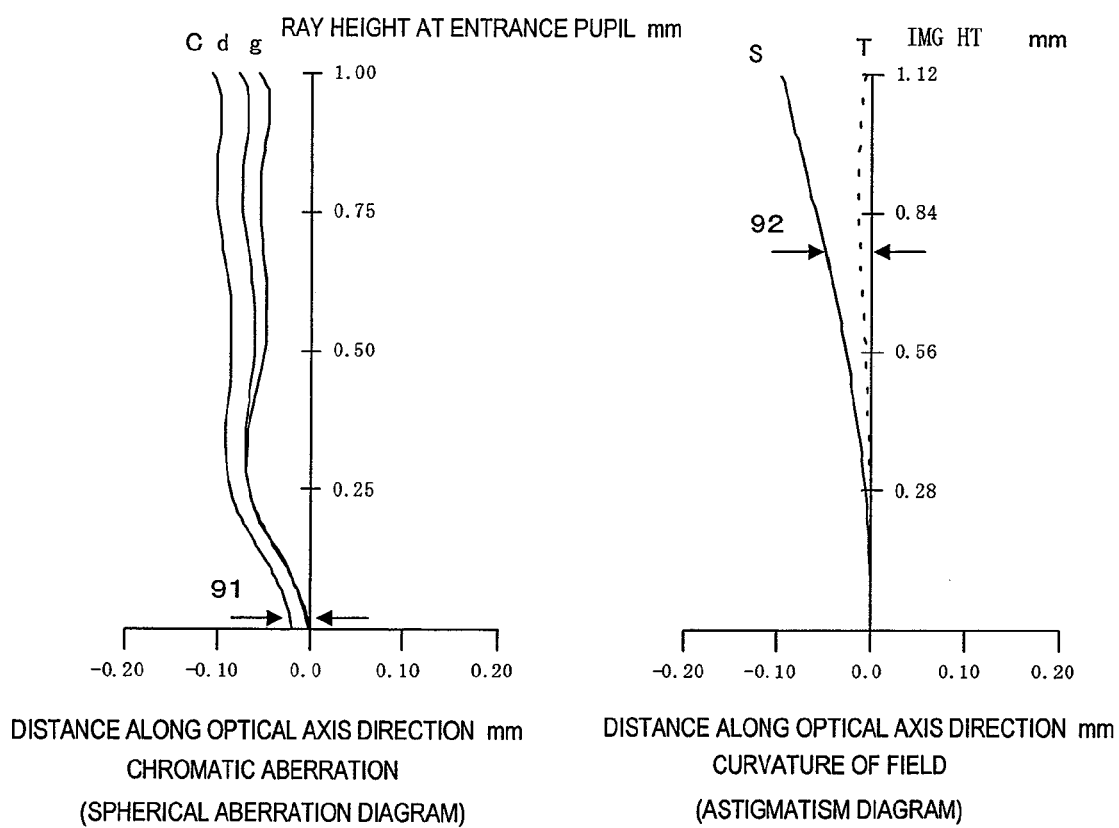
FIG. 9 Diagrams showing chromatic aberration and curvature of field of the diffraction grating lens of Example 3.

FIG. 9 is diagrams showing the chromatic aberration and the amount of curvature of field of Example 3, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 91. In the astigmatism diagram, the horizontal axis represents a distance along the optical axis direction and the vertical axis represents an image height. Therefore, the distance from the vertical axis is the amount of curvature of field aberration 92 at each image height, and, in general, the curvature of field constitutes a spherical surface whose axis is the optical axis. Herein, T means tangential, and S means sagittal.

In FIG. 9, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the correction of chromatic aberration is slightly excessive. Conversely, however, the diffraction power due to the aspheric surface is reduced by this effect, thus making the curvature of field small. Therefore, as is clear from the aberration diagram, the amount of axial chromatic aberration 91 and the amount of curvature of field 92 are adequately corrected in a well-balanced manner.

In Example 3, too, results similar to those of Example 1 are obtained regarding the diagram which shows changes in an RMS value of the amount of curvature of field aberration and the amount of axial chromatic aberration when the proportion of the power of diffraction is varied, i.e., when the value of the constant k is varied.

Example 4

Figure 10:
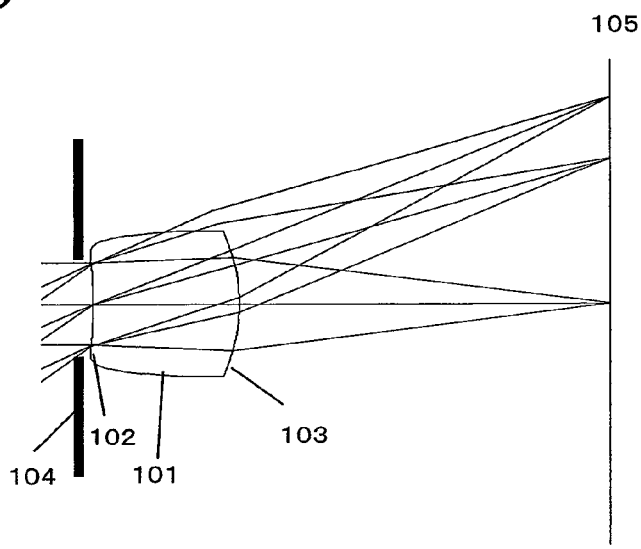
FIG. 10 A cross-sectional view of a diffraction grating lens of Example 4.

FIG. 10 is a diagram showing a lens 101 of Example 4. A diaphragm 104 is added on a first face 102 of the lens 101, and a second face 103 has a diffraction grating formed on its aspheric envelope. An imaging element 105 has a planar shape, and is disposed at the image point.

The substrate material of the lens 101 is a resin whose main component is polycarbonate. As used herein, a "resin whose main component is polycarbonate" means a resin which contains 95 weight % or more, and preferably 98 weight % or more, of polycarbonate. Although polycarbonate is used as the resin, there is no limitation so long as the resin has a predetermined refractive index. For example, polyethylene, polystyrene, or the like may be used.

Numerical data of the diffraction grating lens of Example 4 is shown below.
ω=35.1°
$F_{no}$=4.1
$n_d$=1.585
$v_d$=27.9
t=1.6 mm
(aspheric coefficient of the first face)
c=−0.2063
K=−1669.0694
A=−0.8287
B=5.7144
C=−22.4280
D=34.3588
(aspheric coefficient of the second face)
c=−0.5249
K=−1.3615
A=0.0186
B=−0.1059
C=0.1019
D=−0.0388
(phase factor of the second face)
m=1
design wavelength λ=540 nm
$a_2$=−0.0164
$a_4$=−0.0220
$a_6$=0.0491
$a_8$=−0.0486
$a_{10}$=0.0176
focal length f=3.668 mm
$h_{max}$=1.018 mm
minimum zonal pitch $\Lambda_{min}$=14.0 μm With this construction, the value of the constant k in (eq. 10) is 0.258, thus indicating that Example 4 satisfies conditional expressions (1) and (2).

Figure 11:
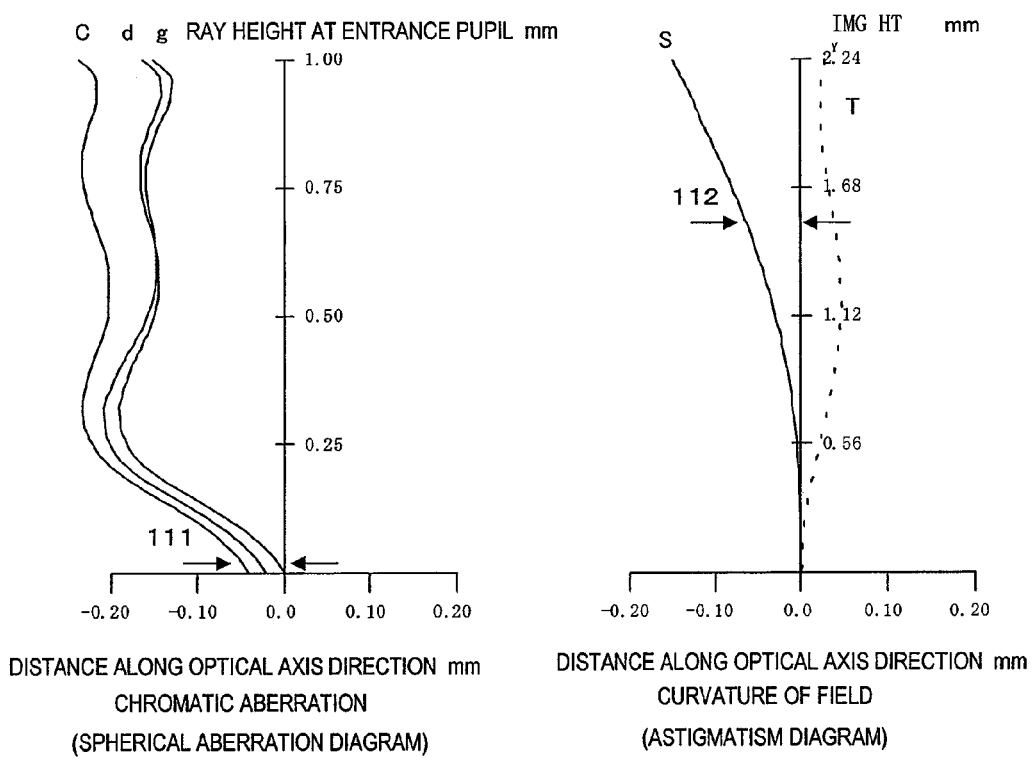
FIG. 11 Diagrams showing chromatic aberration and curvature of field of the diffraction grating lens of Example 4.

FIG. 11 is diagrams showing the chromatic aberration and the amount of curvature of field of Example 4, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 111. In the astigmatism diagram, the horizontal axis represents a distance along the optical axis direction and the vertical axis represents an image height. Therefore, the distance from the vertical axis is the amount of curvature of field aberration 112 at each image height, and, in general, the curvature of field constitutes a spherical surface whose axis is the optical axis. Herein, T means tangential, and S means sagittal.

In FIG. 11, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the correction of chromatic aberration is slightly excessive. Conversely, however, the diffraction power due to the aspheric surface is reduced by this effect, thus making the curvature of field small. Therefore, as is clear from the aberration diagram, the amount of axial chromatic aberration 111 and the amount of curvature of field 112 are adequately corrected in a well-balanced manner.

In Example 4, too, results similar to those of Example 1 are obtained regarding the diagram which shows changes in an RMS value of the amount of curvature of field aberration and the amount of axial chromatic aberration when the proportion of the power of diffraction is varied, i.e., when the value of the constant k is varied.

Example 5

Figure 12:
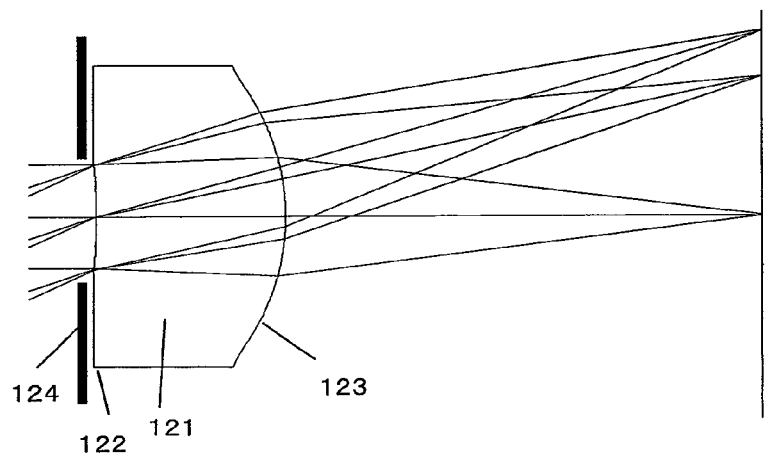
FIG. 12 A cross-sectional view of a diffraction grating lens of Example 5.

FIG. 12 is a diagram showing a lens 121 of Example 5. A diaphragm 124 is added on a first face 122 of the lens 121, and a second face 123 has a diffraction grating formed on its aspheric envelope. An imaging element 125 has a planar shape, and is disposed at the image point.

The substrate material of the lens 121 is a resin whose main component is polycarbonate. As used herein, a "resin whose main component is polycarbonate" means a resin which contains 95 weight % or more, and preferably 98 weight % or more, of polycarbonate. Although polycarbonate is used as the resin, there is no limitation so long as the resin has a predetermined refractive index. For example, polyethylene, polystyrene, or the like may be used.

Numerical data of the diffraction grating lens of Example 5 is shown below.
ω=25.1°
$F_{no}$=4.0
$n_d$=1.585
$v_d$=27.9
t=0.8 mm
(aspheric coefficient of the first face)
c=−0.4029
K=1.0000
A=0.3698
B=−22.2146
C=184.2442
(aspheric coefficient of the second face)
c=−1.0499
K=−0.9047
A=−0.2013
B=1.1609
C=−10.5868
D=24.4636
(phase factor of the second face)
m=1
design wavelength λ=540 nm
$a_2$=−0.0340
$a_4$=−0.1046
$a_6$=0.8766
$a_8$=−2.7825
$a_{10}$=2.3747
focal length f=1.809 mm
$h_{max}$=0.446 mm
minimum zonal pitch $\Lambda_{min}$=15.6 μm With this construction, the value of the constant k in (eq. 10) is 0.255, thus indicating that Example 5 satisfies conditional expressions (1) and (2).

Figure 13:
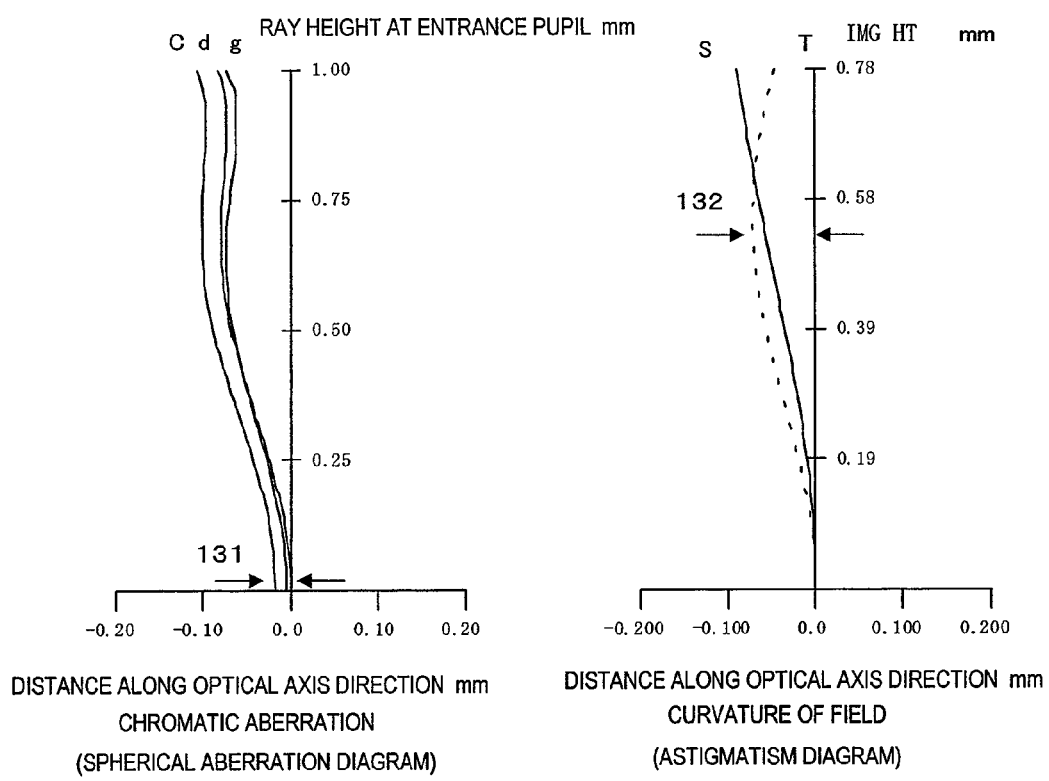
FIG. 13 Diagrams showing chromatic aberration and curvature of field of the diffraction grating lens of Example 5.

FIG. 13 is diagrams showing the chromatic aberration and the amount of curvature of field of Example 5, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 131. In the astigmatism diagram, the horizontal axis represents a distance along the optical axis direction and the vertical axis represents an image height. Therefore, the distance from the vertical axis is the amount of curvature of field aberration 132 at each image height, and, in general, the curvature of field constitutes a spherical surface whose axis is the optical axis. Herein, T means tangential, and S means sagittal.

In FIG. 13, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the correction of chromatic aberration is slightly excessive. Conversely, however, the diffraction power due to the aspheric surface is reduced by this effect, thus making the curvature of field small. Therefore, as is clear from the aberration diagram, the amount of axial chromatic aberration 131 and the amount of curvature of field 132 are adequately corrected in a well-balanced manner.

In Example 5, too, results similar to those of Example 1 are obtained regarding the diagram which shows changes in an RMS value of the amount of curvature of field aberration and the amount of axial chromatic aberration when the proportion of the power of diffraction is varied, i.e., when the value of the constant k is varied.

Figure 14:
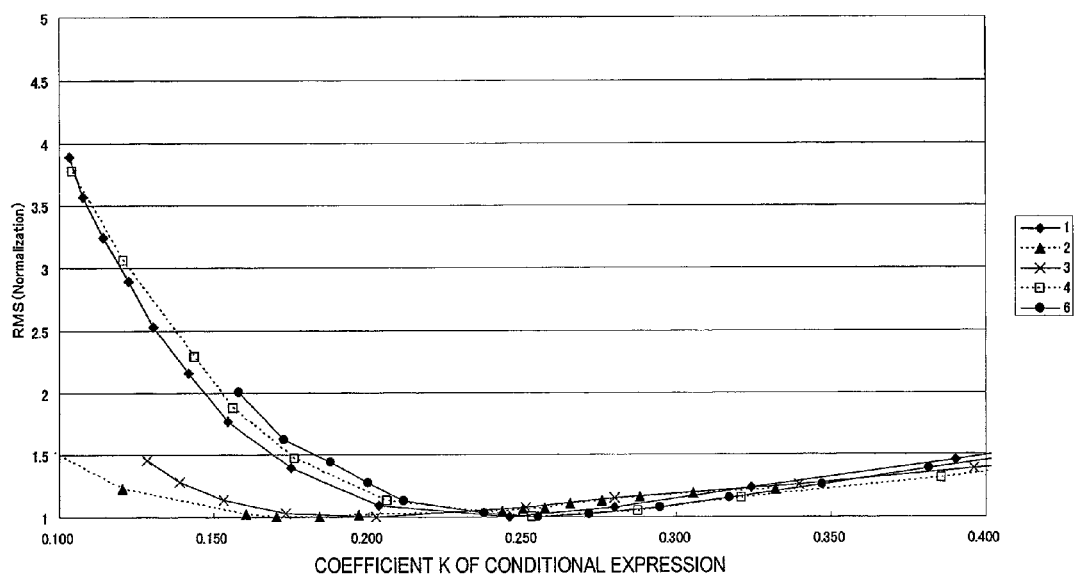
FIG. 14 A graph showing relationships between RMS values of the amounts of curvature of field aberration and the amounts of axial chromatic aberration of the diffraction grating lens of Example 1 to 5 and the k value.

FIG. 14 is a graph of RMS values of Examples 1 to 5. Normalization has been made with respect to the minimum value of each Example, so that the aberration amounts can be evaluated on an equal basis regardless of the specifications.

It is desirable that the RMS value falls within 120% of the value defining the minimum value in the lens data of the respective specifications of Examples 1 to 5. If this range is exceeded, deteriorations in image quality due to aberration, so-called image blurring, will become conspicuous as compared to the scenario under the minimum RMS value. The range of the coefficient k in the conditional expressions in this case is 0.21 to 0.30 from FIG. 14. More preferably, the RMS value falls within 115% of the minimum value, and the range of the coefficient k in this case is 0.21 to 0.28.

Example 6

Figure 15:
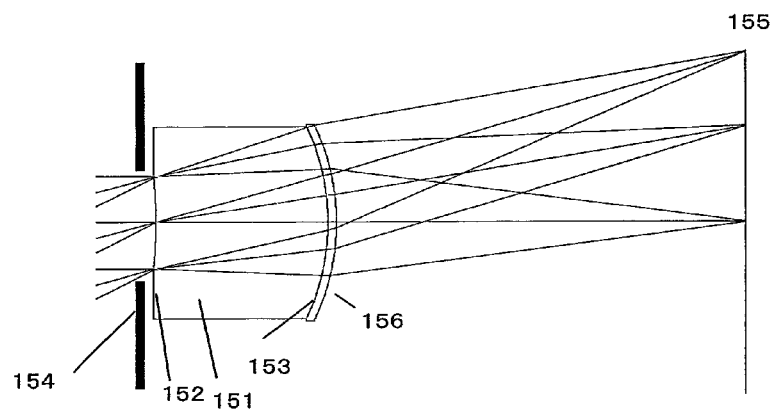
FIG. 15 A cross-sectional view of a diffraction grating lens of Example 6.

FIG. 15 is a diagram showing a lens 151 of Example 6. A diaphragm 154 is added on a first face 152 of the lens 151, and a second face 153 has a diffraction grating formed on its aspheric envelope. Furthermore, a protection film 156 is provided so as to cover the diffraction grating on the second face 163. An imaging element 155 has a planar shape, and is disposed at the image point.

The lens substrate material and the protection film material are composed of a resin and inorganic particles. The lens substrate material is a composite material containing: a resin whose main component is polycarbonate; and zinc oxide (d-line refractive index: 1.683; Abbe number: 18.9; percentage content of zinc oxide in the composite material: 30 volume %; average particle size of zinc oxide: 10 nm). The diffraction grating has a depth of 5.2 μm. As used herein, a "resin whose main component is polycarbonate" means a resin which contains 95 weight % or more, and preferably 98 weight % or more, of polycarbonate. Although polycarbonate is used as the resin, there is no limitation so long as the resin has a predetermined refractive index. For example, polyethylene, polystyrene, or the like may be used. Although zinc oxide is used as the inorganic particles, there is no limitation so long as the inorganic particles have a predetermined refractive index. For example, metal oxides such as titanium oxide, tantalum oxide, zirconium oxide, aluminum oxide, yttrium oxide, silicon oxide, niobium oxide, cerium oxide, indium oxide, tin oxide, or hafnium oxide can be used.

The protection film material is a composite material containing: a resin whose main component is a cycloolefin-type resin; and zirconium oxide (d-line refractive index: 1.796; Abbe number: 41.9; percentage content of zirconium oxide in the composite material: 50 volume %; average particle size of zirconium oxide: 10 nm). This protection film can be formed via application such as spin-coating or dip-coating, or via molding using a die. A "resin whose main component is a cycloolefin-type resin" means a resin which contains 90 weight % or more, and preferably 95 weight % or more, of cycloolefin-type resin. Although a cycloolefin-type resin is used as the resin, there is no limitation so long as the resin has a predetermined refractive index. For example, polyethylene, polystyrene, or the like may be used.

Numerical data of the diffraction grating lens of Example 6 is shown below.

$\omega = 27.0°$
$F_{no} = 3.9$
$n_d = 1.683$
$v_d = 18.9$
$t = 1.0$ mm
protection film thickness: 50 μm
(aspheric coefficient of the first face)
$c = -0.3511$
$K = -1291.4288$
$A = -3.6456$
$B = 66.3340$
$C = -701.2156$
$D = 2937.2028$
(aspheric coefficient of the second face)
$c = -0.7546$
$K = -1.1946$
$A = 0.0026$
$B = -0.1732$
$C = -1.3087$
$D = 4.5807$
$E = -3.7650$
(phase factor of the second face)
$m = 1$
design wavelength $\lambda = 540$ nm
$a_2 = -0.0414$
$a_4 = -0.1082$
$a_6 = 0.6428$
$a_8 = -1.4233$
$a_{10} = 0.9523$
focal length $f = 2.1215$ mm
$h_{max} = 0.5562$ mm
minimum zonal pitch $\Lambda_{min} = 10.4$ μm From these values, the value of the constant k in (eq. 10) is 0.27, thus indicating that Example 6 satisfies conditional expressions (1) and (2).

Figure 16:
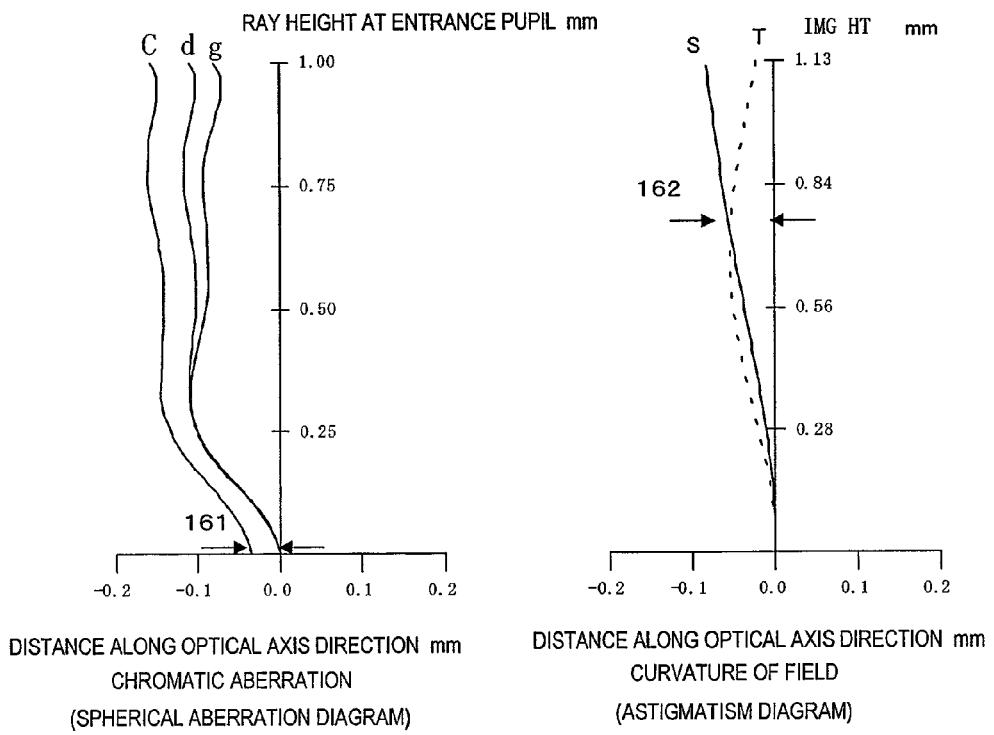
FIG. 16 Diagrams showing chromatic aberration and curvature of field of the diffraction grating lens of Example 6.

FIG. 16 is diagrams showing the chromatic aberration and the amount of curvature of field of Example 6, i.e., a spherical aberration diagram and an astigmatism diagram. In the spherical aberration diagram, the horizontal axis represents a distance along the optical axis direction and the vertical axis represents a height at which a ray enters the entrance pupil, where positions at which rays intersect the optical axis are plotted. Herein, C is the C-line (656.27 nm), d is the d-line (587.56 nm), and g is the g-line (435.83 nm), and a difference between these imaged points is the amount of axial chromatic aberration 161. In the astigmatism diagram, the horizontal axis represents a distance along the optical axis direction and the vertical axis represents an image height. Therefore, the distance from the vertical axis is the amount of curvature of field aberration 162 at each image height, and, in general, the curvature of field constitutes a spherical surface whose axis is the optical axis. Herein, T means tangential, and S means sagittal.

In FIG. 16, the axial chromatic aberration is not completely corrected, and the imaged point of the C-line lies frontward of that of the g-line. In other words, the longer the wavelength is, the shorter the focal length is. This is a state where the power of diffraction due to the diffraction grating is strong and the correction of chromatic aberration is slightly excessive. Conversely, however, the diffraction power due to the aspheric surface is reduced by this effect, thus making the curvature of field small. Therefore, as is clear from the aberration diagram, the amount of axial chromatic aberration 161 and the amount of curvature of field 162 are adequately corrected in a well-balanced manner.

In Example 6, too, results similar to those of Example 1 are obtained regarding the diagram which shows changes in the RMS value of the amount of curvature of field aberration and the amount of axial chromatic aberration when the proportion of the power of diffraction is varied, i.e., when the value of the constant k is varied.

Figure 17:
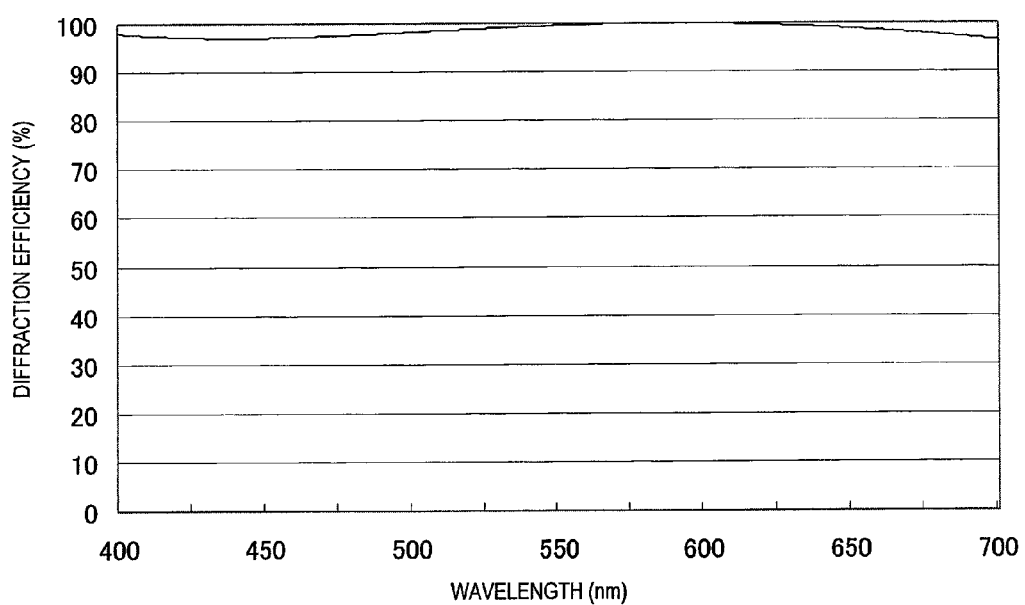
FIG. 17 A graph showing a wavelength dependence of $1^{st}$-order diffraction efficiency in the diffraction grating lens of Example 6.

FIG. 17 is a graph showing wavelength dependence of $1^{st}$-order diffraction efficiency in the diffraction grating lens of Example 6. It can be seen from FIG. 17 that the protection film reduces the wavelength dependence of diffraction efficiency because the diffraction efficiency is 95% or more in the entire visible light region spanning wavelengths of no less than 400 nm and no more than 700 nm.

Note that the protection film on the diffraction grating is desirably added because of its ability to maintain a quite high diffraction efficiency across a wide wavelength region, but it is not essential. Even if it is omitted, a diffraction efficiency of about 80% or more can be maintained, and unique effects are obtained in that the blaze depth is shallow and the construction is simple.

INDUSTRIAL APPLICABILITY

A diffraction grating lens according to the present invention is useful for the optics of small and inexpensive imaging applications, e.g., portable cameras and surveillance cameras.

The invention claimed is:

1. An imaging device having a single lens, the device comprising:
   a diffraction grating lens as the single lens;
   an angle-of-view restriction member for defining a viewing angle of the diffraction grating lens; and
   an imaging element for receiving light transmitted through the diffraction grating lens, wherein,
   the diffraction grating lens includes
   a lens substrate having a first face and a second face, at least one of the two faces having an aspheric shape, and the lens substrate having a positive power, and
   a diffraction grating formed on one of the two faces of the lens substrate; and

[eq. 15]

$$0.21 m^2 v_d \lambda \frac{f}{h_{max}} < \Lambda_{min} < 0.30 m^2 v_d \lambda \frac{f}{h_{max}} \quad (1)$$

is satisfied, where:
   $\Lambda_{min}$ is a minimum zonal pitch; m is an order of diffraction; $v_d$ is an Abbe number of the lens substrate material with respect to the d-line; $\lambda$ is a wavelength; f is an effective focal length; and $h_{max}$ is an effective radius of the face on which the diffraction grating is formed.

2. The imaging device of claim 1, wherein the diffraction grating satisfies the following conditional expression:

[eq. 16]

$$0.21 m^2 v_d \lambda \frac{f}{h_{max}} < \Lambda_{min} < 0.28 m^2 v_d \lambda \frac{f}{h_{max}}. \quad (2)$$

3. The imaging device of claim 1, wherein the angle-of-view restriction member provides restriction of an angle of view such that the maximum half angle of view is in a range from 15° to 40°.

4. A diffraction grating lens for an imaging device having an angle-of-view restriction member for defining a viewing angle of the lens, and an imaging element for receiving an image formed by the lens, comprising:
   a lens substrate having a first face and a second face, at least one of the two faces having an aspheric shape, and the lens substrate having a positive power; and
   a diffraction grating formed on one of the two faces of the lens substrate, wherein,
   the diffraction grating satisfies:

[eq. 17]

$$0.21 m^2 v_d \lambda \frac{f}{h_{max}} < \Lambda_{min} < 0.30 m^2 v_d \lambda \frac{f}{h_{max}}, \quad (1)$$

where: $\Lambda_{min}$ is a minimum zonal pitch; m is an order of diffraction; $v_d$ is an Abbe number of the lens substrate material with respect to the d-line; $\lambda$ is a wavelength; f is an effective focal length; and $h_{max}$ is an effective radius of the face on which the diffraction grating is formed; and
   a maximum half angle of view is from 15° to 40°.

5. The diffraction grating lens of claim 4, wherein the diffraction grating satisfies:

[eq. 18]

$$0.21 m^2 v_d \lambda \frac{f}{h_{max}} < \Lambda_{min} < 0.28 m^2 v_d \lambda \frac{f}{h_{max}}. \quad (2)$$

* * * * *